(12) United States Patent
Kuchel

(10) Patent No.: US 6,943,896 B2
(45) Date of Patent: Sep. 13, 2005

(54) RECONFIGURABLE INTERFEROMETER SYSTEM

(75) Inventor: Michael Kuchel, Oberkochen (DE)

(73) Assignee: Zygo Corporation, Middlefield, CT (US)

(*) Notice: Subject to any disclaimer, the term of this patent is extended or adjusted under 35 U.S.C. 154(b) by 7 days.

(21) Appl. No.: 10/967,982

(22) Filed: Oct. 19, 2004

(65) Prior Publication Data

US 2005/0083537 A1  Apr. 21, 2005

Related U.S. Application Data

(60) Provisional application No. 60/512,659, filed on Oct. 20, 2003.

(51) Int. Cl.[7] ............................................. G01B 9/02
(52) U.S. Cl. ........................................................ 356/513
(58) Field of Search ................................. 356/489, 495, 356/496, 511, 512, 513, 514

(56) References Cited

U.S. PATENT DOCUMENTS

| | | |
|---|---|---|
| 4,347,441 A | 8/1982 | Dil et al. |
| 5,004,346 A | 4/1991 | Kuhel |
| 5,187,539 A | 2/1993 | Adachi et al. |
| 5,416,586 A | 5/1995 | Tronolone et al. |
| 6,312,373 B1 | 11/2001 | Ichihara |
| 6,359,692 B1 | 3/2002 | DeGroot |
| 6,456,382 B2 | 9/2002 | Ichihara et al. |
| 6,714,308 B2 | 3/2004 | Evans et al. |
| 6,717,680 B1 | 4/2004 | Kuchel et al. |
| 6,771,375 B2 | 8/2004 | Zanoni |
| 2003/0002048 A1 * | 1/2003 | Zanoni ..................... 356/512 |
| 2003/0043385 A1 | 3/2003 | Kuchel |
| 2003/0103215 A1 | 6/2003 | Kuchel |

OTHER PUBLICATIONS

Contouring aspheric surfaces using two-wavelength phase shifting interferometry, Creath et al, Optica ACTA, 1985, pp1455-1464.*

* cited by examiner

Primary Examiner—Samuel A. Turner
(74) Attorney, Agent, or Firm—Francis J. Caufield

(57) ABSTRACT

Interferometric apparatus and methodology for precisely measuring the shape of rotationally and non-rotationally symmetric optical surfaces comprising an illumination source with two wavelengths, a transmission flat with a reference surface, a basic optical system for producing a wavefront of predetermined shape, a compensation component having an aspheric wavefront shaping surface and an aspheric reference surface. The aspheric shaping surface modifies the predetermined wavefront so that it impinges on the aspheric reference surface with a shape substantially that same as that of aspheric reference surface. For a given aspheric reference surface, the radius or curvature and spacing of the aspheric shaping surface are optimized so that its aspheric departure is no larger than that of the aspheric reference surface. Precise alignment in six degrees of freedom is provided via feedback control.

25 Claims, 4 Drawing Sheets

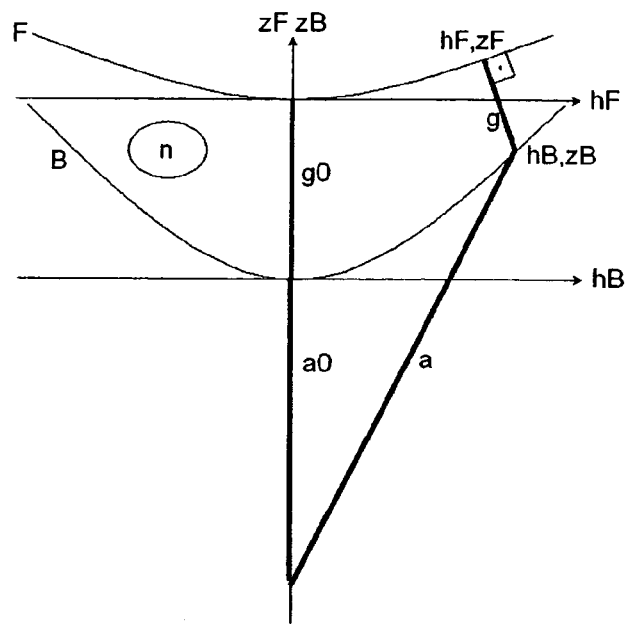
Fig. 3 (LEFT)
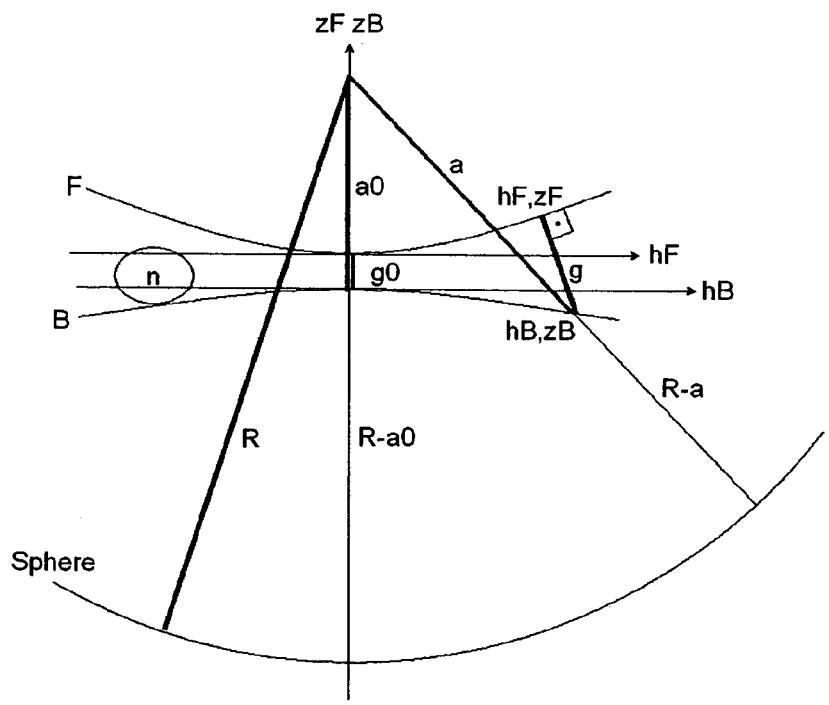
Fig. 3 (RIGHT)

RECONFIGURABLE INTERFEROMETER SYSTEM

CROSS REFERENCE TO RELATED APPLICATION

This application claims the benefit of priority from U.S. Provisional Application No. 60/512,659 filed on Oct. 20, 2003 with the title RECONFIGURABLE INTERFEROMETER SYSTEM, the entire contents of which are incorporated herein by reference.

FIELD OF THE INVENTION

This invention in general relates to interferometric metrology of surfaces and more particularly to interferometric apparatus and methods by which optical surfaces can be compared.

BACKGROUND OF THE INVENTION

The problem to be solved by the invention is to compare two optical surfaces, spheres or aspheres, which have nominally the same shape. This may done with a Fizeau interferometer system by placing the first surface, called the master calibration surface, in front of the Fizeau reference surface and then making a measurement of the resulting phase difference of the light reflected off the Fizeau reference surface and the master calibration surface. The result is stored, and next, the master calibration surface is replaced by the second surface, called the test surface. Following this, another interferometric measurement is performed on the phase difference of the light reflected off the Fizeau reference surface and the test surface.

Subtracting the second measured phase difference from the first measured phase difference delivers the wanted deviation of the test surface from the master calibration surface. For the correct result to be delivered, several preconditions have to be fulfilled as well as possible: (1) the Fizeau reference surface should not have changed its shape between the two measurements; (2) the wavefronts illuminating the interferometer "cavities" in both the case of the master surface and the test surface should be identical; and (3) the absolute position of the master calibration surface and the test surface in front of the Fizeau reference surface should be identical in both cases. "Absolute position" means an alignment in 6 degrees of freedom, where the rotation around the optical axis is of minor concern for rotationally symmetrical optical surfaces. When the surfaces to be compared are aspherical surfaces tolerances are in the range of a few nm in order to meet the uncertainty targets for the comparison measure.

Consequently, it is a principal object of this invention to assure that the wavefronts and positioning in both cases is substantially identical within the limits required to achieve the precision needed.

Another problem which is solved by the invention is described is as follows. When the surfaces to be compared are aspherical surfaces, it is necessary to provide a Fizeau reference surface which follows the shape of the surface to be compared in such a way that the normal distance of the two surfaces has a constant value, and that the wavefront illuminating the Fizeau reference surface matches the shape of the aspheric Fizeau reference-surface as well as possible.

For the normal distance of the two surfaces to be a constant value, it is necessary that the Fizeau reference surface is also an aspherical surface, very similar to the surfaces to be compared.

To fulfill the second precondition, the known technique is to design so-called null lenses, which are high precision, very expensive, and bulky lens systems, which consist of a larger number of spherical lens elements. In some cases, it is very difficult to design a null system, which meets the requirements for a given aspherical surface, and in all cases, an experienced specialist is needed to design such a null lens. Because very high standards must be met for manufacturing, the cost of material and the cost of labor for building such a null lens are also very high.

Consequently, it is another goal of the invention to provide methods for solving the problem in a very straight forward, deterministic, very cost effective, and elegant way.

Other objects of the invention will appear hereinafter and will be obvious when the following detailed description in read in connection with the drawings.

SUMMARY OF THE INVENTION

An interferometric system and methodology for testing spherical and/or aspherical surfaces is disclosed.

In one aspect the apparatus comprises means for mounting a test optic to be measured so that it can be illuminated as it is precisely aligned. An illumination source provides a beam of illumination having at least two wavelengths, and a transmission flat follows the illumination source. A basic optical system follows the transmission flat and operates to receive the beam of illumination and generate at least one basic wavefront of predetermined shape. A compensation component follows the basic optical system by a predetermined distance. The compensation component comprises a first aspherical surface and an aspherical reference surface with the first aspherical surface having a radius of curvature and position such that its aspherical departure is no larger than that of the aspherical reference surface. The compensation component operates to modify the basic wavefront so that it impinges on the aspherical reference surface with substantially the same shape as that of the aspherical reference surface and such that a part of it is reflected therefrom to serve as a reference wavefront and a part is transmitted as a continuing wavefront that impinges on the test optic and is reflected therefrom as a measurement wavefront that travels back towards the aspherical reference surface when the aspherical reference surface is precisely aligned adjacent the test optic to be measured. Means for combining the reference and measurement wavefronts are provided to form an interferogram containing phase information indicative of the shape of the wavefront generated by the test optic.

Included are means for performing multi-phase shifting interferometry utilizing both wavelengths of the beam of illumination to precisely set the predetermined distance separating the basic optical system from the compensation component.

Additionally included are means for measuring the alignment of the compensation component with respect to the basic optical system and providing feedback control signals to precisely position the compensation component by correcting for misalignments thereof, preferably in six degrees of freedom.

Three simultaneous interferograms are formed for purposes of facilitating alignment including one interferogram formed between a reference surface placed in front of the basic optical system and the aspherical reference surface, another interferogram formed between the test surface and the aspherical reference surface, and a third interferogram which is formed between the reference surface placed in front of the basic optical system and the test surface.

Computational means are provided for separately computing three phase-differences encoded in the three interferograms using different phase-steps and two phase-shifters that change the phase-difference in all three interferometric cavities in a way that produces a system of equations having a non-vanishing determinant. Two imagers or cameras are provided to facilitate simultaneous measurement, as well as means for precisely aligning the test optic with respect to the aspherical reference surface.

In another aspect the invention is an interferometric method for measuring rotationally and non-rotationally symmetric test optics comprising the steps of mounting a test optic to be measured so that it can be illuminated as it is precisely aligned; generating a beam of illumination having at least two wavelengths; providing a transmission flat with a reference surface following said illumination source; generating at least one basic wavefront having a predetermined shape; providing a compensation component, the compensation component comprising a first aspherical surface and an aspherical reference surface; the first aspherical surface having a radius of curvature and position such that its aspherical departure is no larger than that of the aspherical reference surface, the compensation component operating to modify the basic wavefront so that it impinges on the aspherical reference surface with substantially the same shape as that of the aspherical reference surface and such that a part of it is reflected therefrom to serve as a reference wavefront and a part is transmitted as a continuing wavefront that impinges on the test optic and is reflected therefrom as a measurement wavefront that travels back towards the aspherical reference surface when the aspherical reference surface is precisely aligned adjacent the test optic to be measured; and combining the reference and measurement wavefronts to form an interferogram containing phase information indicative of the shape of the wavefront generated by the test optic.

Further included is the step of performing multi-phase shifting interferometry utilizing both wavelengths of the beam of illumination to precisely align the compensation component with respect to the basic wavefront.

Additionally included is the step of measuring the alignment of the compensation component with respect to the basic wavefront and providing feedback control signals to precisely position the compensation component by correcting for misalignments thereof, wherein the alignment preferably is carried out in six degrees of freedom.

Three simultaneous interferograms are formed for purposes of facilitating alignment and separately computing three phase-differences encoded in the three interferograms using different phase-steps and two phase-shifters that change the phase-difference in three interferometric cavities in a way that produces a system of equations having a non-vanishing determinant. The method also includes the step of precisely aligning said test optic with respect to the aspherical reference surface.

BRIEF DESCRIPTION OF THE DRAWINGS

The structure, operation, and methodology of the invention, together with other objects and advantages thereof, may best be understood by reading the detailed description in connection with the drawings in which each part has an assigned numeral or label that identifies it wherever it appears in the various drawings and wherein:

FIG. 3 diagrammatically shows a single lens aspheric Fizeau with B=compensation surface, F=aspherical reference surface with the Left: label being for the case of a diverging spherical wavefront illuminating the aspherical compensation surface, and the right: label being for the case of a converging spherical wavefront illuminating the aspherical compensation surface. The optical paths are shown in air as well as in the glass material. The centers of the spherical waves build the object point as well as the image point of the rays, which are reflected at the aspherical Fizeau surface;

DETAILED DESCRIPTION OF THE INVENTION

Figure 1:
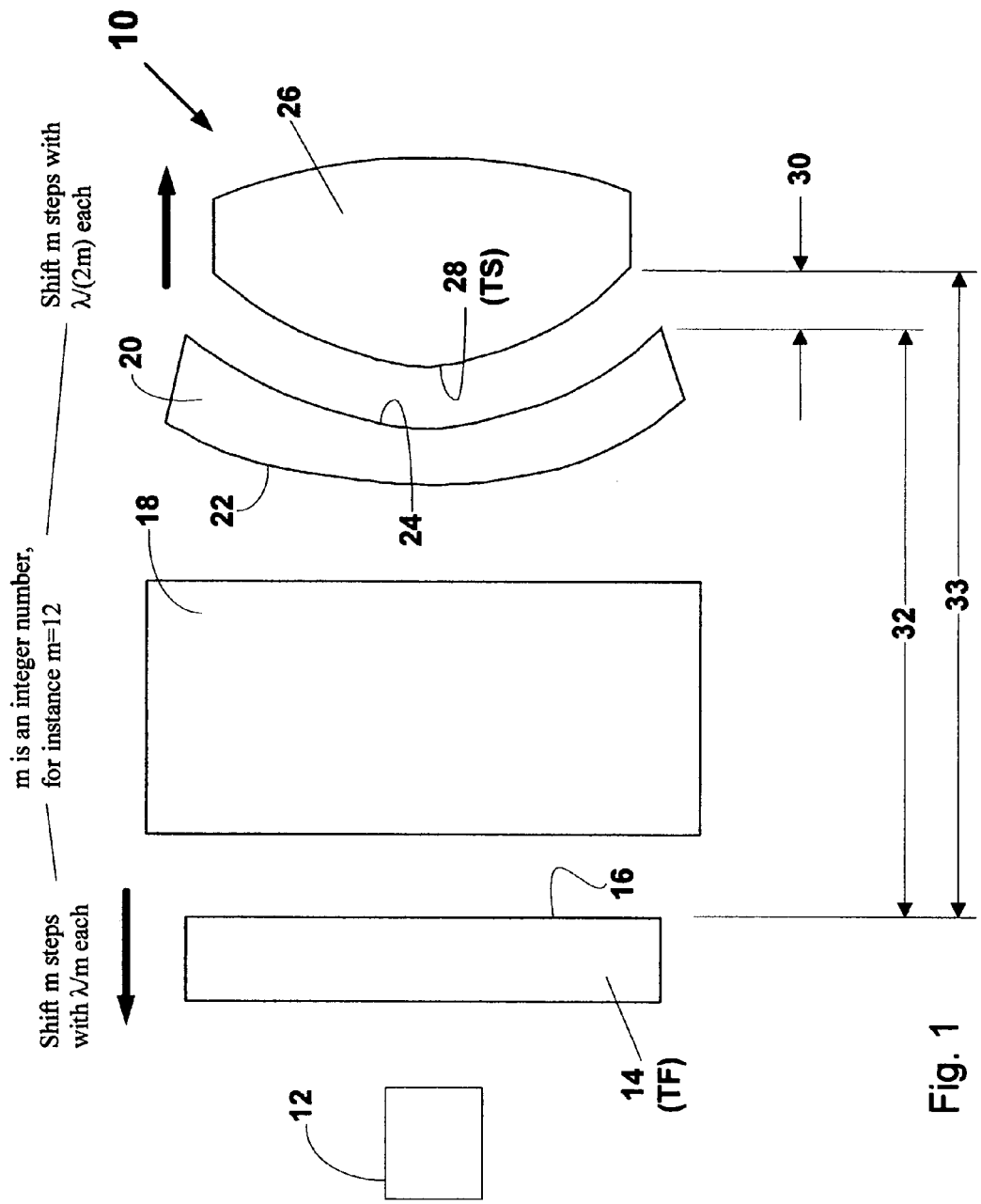
FIG. 1 is a diagrammatic elevational view illustrating the movement-of a transmission flat (TF) and test surface (TS) in m steps of by an amount of $\lambda/m$ and $\lambda/(2m)$ respectively in different directions for phase-shifting purposes which results in a system of equations for the phase values in the 3 cavities having a unique solution.

An interferometer system and methodology will be described for testing spherical or aspherical surfaces. The system is illustrated in simple form in FIG. 1 where is designated generally at 10 and is seen to comprise a coherent light source 12 with preferably two wavelengths, a transmission flat (TF) 14 having a reference surface 16, a lens or basic optical system 18 for generating a convergent (or a divergent) wavefront of known or predetermined shape (mostly but not necessarily of spherical shape) and a reconfigurable (i.e., exchangeable) additional compensation element or component 20 having a compensation surface 22 and carrying a Fizeau reference surface 24 which may be aspherical. The compensation component 20 could be the aplanatic surface of the backside of a lens element, which has a concentric Fizeau reference surface on its front side in the case of testing spheres. In the case of aspherical surface testing, the compensation element could be an aspherical backside of a lens element, which carries an aspherical Fizeau reference surface on its front side. The compensation element could also be a hologram followed by a lens element, which carries a spherical surface at its front side and an aspherical Fizeau reference surface at its backside. Or, it can be a lens with one aspherical surface and one spherical surface or also with two spherical surfaces in addition to the lens carrying the aspherical reference surface on its front side and a spherical or aspherical surface on its backside. The case when two elements are used could be useful to reduce the amount of aspherical departure needed for the compensation element. A test component 26 carrying a test surface 28 precisely is aligned adjacent the Fizeau reference surface 24.

In all of the cases mentioned above, one of the main characteristics of the invention is that an interferogram is formed in a cavity 32 located between reference surface 16 placed in front of the optical system illuminating the Fizeau reference surface (i.e., the basic lens+the compensation element) and the Fizeau reference surface 24. Simultaneously, another interferogram is formed in a cavity 30 located between the test surface 28. (or a master calibration surface in case this is placed in front of the Fizeau reference surface) and the Fizeau reference surface 24, as well as a third interferogram which is formed in a cavity 33 located between the reference surface 16 placed in front of the optical system illuminating the Fizeau surface and the test surface 28 (or the master surface respectively). All three interferograms build up simultaneously. It is known from the invention described in U.S. Pat. No. 6,717,680 issued on Apr. 6, 2004 in the name of Michael Küchel and Leslie L. Deck with the title Multiple Phase Shifting Interferometry, which is incorporated herein by reference, that it is possible to separately compute three phase-differences encoded in the three interferograms by an approach that uses different phase-steps on two phase-shifters that change the phase-difference in all three interferometric cavities in a way that the underlying system of equations has a non-vanishing determinant. One possible solution for the movement of the TF 16 and the Test Surface 28 is given in shown in FIG. 1.

Figure 2:
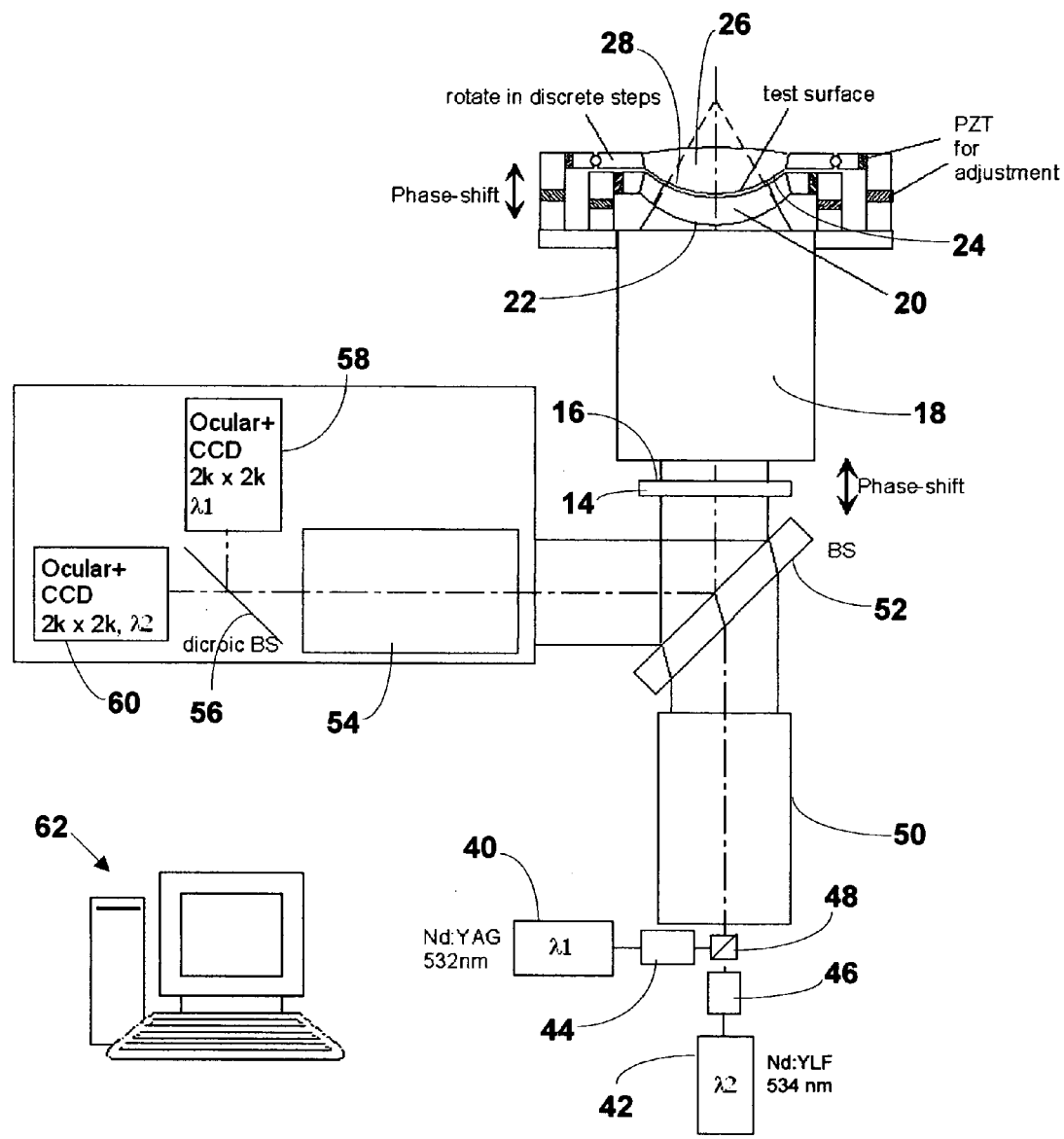
FIG. 2 is a diagrammatic example of a preferred embodiment of the invention.

The mathematical analysis of the wavefront illuminating the Fizeau-cavity allows for the extraction of position information of the compensating component 26 (as a single element or a sub-assembly) carrying the Fizeau reference surface 24, and by closed control loop, this information can be used to adjust the position of the compensating component 24 in front of the basic optical system 18 as shown in FIG. 1. The mathematical procedure to be followed is, for instance, to simulate by a ray-tracing program all possible misalignments, which are linear displacements of the compensation elements in x; y; z directions and tilts around the x- and y-axis, one at a time. Every time one misalignment component is changed by a small amount $\Delta$, (i.e. $\Delta x$, $\Delta y$, $\Delta z$, $\Delta a$, $\Delta s$), the set of aberration terms (for instance, expressed in terms of Zernike functions) is computed. Thus, the differential quotients of the aberration coefficients to the misalignment terms are obtained. By inverting this sensitivity matrix and multiplying with the set of aberration terms actually found in the measured phase-difference, the actual mechanical misalignments are derived and converted to a control signal. These signals now can drive, for instance, piezoelectric transducers (PZT as shown in FIG. 2) that position the compensation component or element 26. Even when the measured aberration terms do not exactly result from mechanical misalignments but, for instance, from a temperature change with an associated change in the refractive index of the lens elements in the interferometer cavity between the TF 14 and the Fizeau reference surface 24, it is desirable to compensate the resultant optical aberration by a change in the position of the Fizeau-surface 24. In such a case, the aberration cannot be made zero, but it will be reduced by at least an order of magnitude.

It is a characteristic of the task of comparing two surfaces with each other sequentially with the help of a third surface having the "negative" shape of the surfaces to be compared, that changes in all conditions for both comparisons to be performed should be kept to a minimum. As just described above, even when it is not possible by mechanical adjustments to compensate all changes in the illuminating wavefront, the knowledge of the exact shape of the wavefronts illuminating the interferometer cavity in both cases allows for mathematically compensating for the residual effects on the measurement. Therefore, the simultaneous measurement of these wavefronts, together with the phase-differences in the main interferometer cavity, is very useful for achieving a low measurement uncertainty.

The third goal of the invention is to solve the problem of positioning the two surfaces to be compared, e.g. master and test surfaces, in front of the Fizeau reference surface 24 in exactly the same position (6 degrees of freedom; where only 5 are of major interest and also only these 5 can be controlled; rotation about the optical axis is of minor importance). This positioning requirement includes the absolute distance of the surfaces from the reference surface 24 because very tight tolerances must also be met for the absolute radius of curvature of the aspherical or spherical surfaces.

The problem of measuring the absolute distance of the surfaces from the Fizeau reference surface 24 is solved by the invention by using two laser wavelengths which are located very close to each other, for instance, the wavelength 488.0 nm and 496.5 nm of an AR+ laser or the wavelengths 532 nm and 534 nm of a frequency doubled Nd:YAG laser and a frequency doubled Nd:YLF Laser, or similarly close operating wavelengths. In FIG. 2, which is a more detailed illustration of the invention, there is a first laser 40 operating at wavelength $\lambda_1$ and a second operating at a wavelength $\lambda_2$. The output beam from laser 40 is pre-shaped by an optical arrangement 44, for instance, first focused to a point, then collimated and directed through a hologram and an ocular to make it a ring shaped light source in the focal plane of collimator lens 50; the output beam of laser 42 is pre-shaped by an optical arrangement 46, for instance first focused to a point, then collimated and directed through a hologram and an ocular to make it a ring-shaped light source in the front focal plane of the collimator lens 50. Both beams are combined by the beam combiner 48 after which they transit the collimator 50. Following collimator 50 is a second beam splitter 52, the transmission flat 16 and then the basic lens system 18 in the form of a de-collimator lens for forming a wavefront, either converging or diverging as the case requires, and of predetermined and controllable shape. Reference and return wavefronts forming interferograms in the various cavities defined earlier are imaged on to CCD photo detectors 58 and 60 after reflection from beam splitter 52 and having transited a collimator 54 after which they have been separated by wavelength by a dichroic beam splitter 56. Mathematical analysis and system control, user interface, data manipulation and storage, and housekeeping functions are provided via a computer 62 provided with appropriate software in the conventional way.

According to the invention, all three interferograms of the three possible combinations of two beams are built up by both wavelengths (in total 6 interferograms), but captured separately by two CCD-detectors 58 and 60. This is achieved by the use of the dichroic beam splitter 56.

Alternatively, the lasers could be chopper synchronized with the camera frames. A third variation is to use both lasers simultaneously and apply a more complicated phase-shifting algorithm with more phase-steps involved in order to separate all 6 interferograms mathematically. This last approach is not as desirable because a larger travel for the phase-shifter moving the test surface 28 (or the master calibration surface) is needed, which means a larger misalignment is also induced by this. The first method is the most expensive one, but has the additional benefit that the measurement uncertainty related to noise-sources in the cameras, and also some noise-sources, in the optical set up are reduced by the combined use of the results form both measurements.

When the difference of the two phase maps measured at the interferometer cavity 30 between the test surface and the Fizeau reference surface is computed, the piston term (the constant term) of a Zernike evaluation carries the information of the absolute optical cavity thickness. The cavity thickness can be unambiguously derived when it is smaller than half of the value of the resultant wavelength:

$$\lambda_{res} = \left(\frac{1}{\lambda_1} - \frac{1}{\lambda_2}\right)^{-1} \quad (1)$$

In the case of a wavelength-pair 488 nm and 496.5 nm, the resultant wavelength is 28.505 $\mu$m, so the periodic ambiguity of the absolute cavity thickness is. $\lambda_{res}/2=14.253$ $\mu$m in this case. In the case of a test surface which fulfills the shape requirement to a relatively small departure form the final needed deviation from the design shape, a cavity which is set up with an error larger than $\lambda_{res}/2=14.253$ $\mu$m will result in a severe mismatch, i.e., in large aberrations measured as the phase difference in the mean cavity. This is true when the test surface 28 has a radius of curvature smaller than 1000 mm, or when the aspheric departure from the best fitting sphere is larger than 100 $\mu$m. As only surfaces of known high quality have to be measured, it can be assumed, in this case, that strong aberrations are measured in the cavity, that a wrong order number of $\lambda^{res}$ is kept. The resultant wavefront aberration of the design asphere for the cavity with periodic increasing gap errors as multiples of $\lambda_{res}/2$ can be precalculated, and the actual measured aberrations can be compared to these precalculated aberrations. Thus, the integer multiple "order number" M for the mismatch of the cavity thickness can be determined . . . Having resolved the position ambiguity with an uncertainty smaller than $\lambda_{res}/4$ in this way, the calculated difference of the phase values measured with both wavelengths allows determining the cavity thickness to better than $\lambda_1/4$ (and equivalently also $\lambda_2/4$) and then use the phase result from both measurements directly to get the cavity thickness to a small fraction of $\lambda_1/4$ or $\lambda_2/4$, typically to 0.05 nm RMS.

The cavity 30, therefore, in a first step is set up to the roughly correct thickness by inspecting the interferogram and minimizing the aberrations. Then, the absolute cavity thickness is computed from the difference of the phase differences from both wavelengths, and finally, to a small fraction of the wavelength used for measurement. In each of the steps described, a control signal is given to the PZTs for moving the test surface 28 until the predefined cavity thickness is met at the coordinate center (i.e., at the symmetry point of the surface).

In addition to that, the PZTs for alignment of the test part with respect to the Fizeau reference surface 24 and also the master calibration part with respect to the Fizeau reference surface 24 is done by analyzing the aberrations in the wavefront for tilt and coma and adjusting the parts in front of the cavity every time that these aberrations coefficients are zero. This is also true when the test part (or master calibration part) is rotated in front of the Fizeau reference surface 24.

Summarizing, the key features of the invention are:
(1) A means for an inexpensive quasi-null aspheric Fizeau is shown using a basic lens and the addition of a single element or component which carries the Fizeau-reference surface as well as the aspheric compensation surface.
(2) The design of the compensation surface is a deterministic procedure, which allows for quick and easy optimization of the location of the compensation surface with the goal to minimize the needed aspherical departure of that surface.
(3) Use is made of three-beam interference and double phase-shift algorithm (TF and test-surface) to get from one interferogram the information on: (A) alignment of the 1-lens Fizeau, and (B) the interferogram between test-surface and reference surface.
(4) Use 2 (Nd:YAG and Nd:YLF) lasers simultaneously but with two separate cameras with dichroic beamsplitter and beam combiner for: (a) measuring the very small gap ABSOLUTELY and (b) decreasing the uncertainty of the measurement (noise induced) by nearly a factor of $\sqrt{2}$.
(5) All adjustments are made as a servo-loop during the measurement, i.e., measurement and adjustment in a single, integrated action.

The steps contained in the inventive method for practicing the invention are briefly set forth as follows:

Procedure:
(1) Measure a master calibration asphere in accordance with, for example, U.S. Pat. No. 6,771,375;
(2) Set up the master calibration asphere and measure both the optical performance of the wavefront illuminating the Fizeau reference surface (single-element Fizeau QN-lens) in front of the De-Collimator with the interferogram between the TF and the Fizeau-surface and simultaneously the wavefront of the master-surface compared to the Fizeau-reference surface. Keep both sets of data.
(3) At the same time, measure the gap absolutely (everywhere, because two wavelengths are simultaneously, but individually, accessible by the two cameras).
(4) Set-up the aspheric test surface and do as in steps 2, 3 and 4.

Data evaluation: The rotationally variant terms of the test surface 28 are measured in situ absolutely (without calibration). For the mean radial profile of the test surface 28 subtract the computed mean radial profile of the calibration surface from the mean radial profile of the test surface 28. In addition, compute the impact of the differences in the illuminating wavefront onto the small cavity on the mean radial profiles in both cases and use this information as an additional correction term.

In further detail, U.S. Pat. No. 6,771,375 disclosed that an-aspherical test surface can be tested against an aspherical Fizeau reference surface. It is also described there, that the aspherical reference surface must be illuminated by an aspherical wavefront that must match very closely the shape of the aspherical reference surface. It is described in this invention disclosure how the shape of the Fizeau surface matching the test surface can be mathematically derived under the condition that the normal distance between both surfaces (the interferometer "cavity") has a constant value which must be chosen beforehand and precisely met in the actual test. In addition, the aspherical Fizeau surface must be qualified beforehand in another test set-up that provides an "absolute" measure of the deviations of the aspherical reference surface, or alternatively a master surface or calibration artifact must be tested in another set-up that provides an "absolute" measure of the master surface. This other set up is for instance the Scanning Interferometer for Aspheric Surfaces and Wavefronts described in U.S. Published Patent Application, No. US-2003-0043385-A1. Thus, the purpose of the test set up described in U.S. Pat. No. 6,771,375 is to provide a means for easily comparing a given test surface with a given aspherical reference Fizeau surface.

The reconfigurable interferometer system described in this invention achieves this goal in a very cost effective way and at the same time leads to a very low measurement uncertainty (See again FIG. 2).

The key feature for reaching the goal of relatively low cost is to provide a means to change a basic wavefront generated by a basic optical set up, i.e., one which is not changed, by the addition of one or a few number of elements in such a way that the Fizeau reference surface is illuminated with a wavefront closely matching its shape. There are a number of different possibilities for doing this in an effective way, which will be described later in more detail.

One element with an aspherical compensation surface will be described in detail here; additional possibilities include adding a second compensation lens to relax the requirements for the steepness of the asphere. The aspheric compensation surface can be replaced by the use of a computer-generated hologram. In addition, the invention and its benefits are not restricted to the case of testing aspherical surfaces, but can also be used to test spherical surfaces with very low measurement uncertainty. This also will be described later in detail, e.g., basic system—decollimator or diverger—delivers a spherical wavefront, added to this is a single lens which has an aplanatic surface facing the basic system and a concentric Fizeau reference surface facing the test surface; for every spherical surface to be tested such a lens is provided which makes it possible to keep the air-gap very small as a precondition for low measurement uncertainty.

In a most simple example (See FIG. 2), the basic system consists of one or two lasers as a light source, which delivers two coherent wavelengths known very well and used together. As described before, the combined beams are expanded and collimated and pass a beam splitter 52. Part of the plane wave is reflected at a transmission flat 14 (TF), part is transmitted and de-collimated by a de-collimator optic 18. This part of the system builds the basic "illumination part". Now the illumination part is made complete by the addition of one single lens-element 20, which carries at the side facing the de-collimator 18, an aspherical compensation surface 22, and at the side facing the test surface, an aspherical Fizeau reference surface 24.

After the wavefront generated by the de-collimator 18 has transited the aspherical compensation surface 22 and traveled in the glass of the lens with refractive index n and center thickness g0, when reaching the Fizeau reference surface 24, it has the shape closely matching the design value of the Fizeau reference surface 24. Given a de-collimator lens, a certain center thickness and an index of refraction for the additional element carrying the compensation surface 22 as well as the Fizeau-surface 24, the only degree of freedom for changing the shape of the compensation surface 22 is its radius of curvature. When this radius is changed during the design, two things must follow strictly when the conditions of a wavefront matching the reference surface shape have to be fulfilled: the aspheric departure has to be defined and the distance of the lens to the de-collimator has to be set to the correct value.

Looking at the aspheric departure as a function of the radius of curvature provides the means to quickly find the minimum of that function. This problem is solved by analytically calculating the shape of the compensation surface for a given aspheric Fizeau surface; see FIG. 3 labeled left and right. The equations are for a point on the compensation surface expressed in the hB, zB coordinate system:

$$hB = hF + g\sin\alpha = hF + \frac{g\tan\alpha}{\sqrt{1+\tan^2\alpha}} = hF + \frac{g \cdot zsF}{\sqrt{1+zsF^2}} \text{ where} \quad (2)$$

$$zsF^2 = \frac{dzF}{dhF}$$

$$zB + g\cos\alpha = \quad (3)$$
$$g0 + zF \rightarrow zB = g0 + zF + \frac{g}{\sqrt{1+\tan^2\alpha}} = g0 + zF + \frac{g}{\sqrt{1+zsF^2}}$$

From the Fermat's principle, it follows:

$$n \cdot g0 + a0 = n \cdot g + a \rightarrow g = \frac{n \cdot g0 + a0 - a}{n} \text{ with} \quad (4)$$
$$a = \sqrt{(a0+zB)^2 + hB^2}$$

This must be inserted into Eqs. (2) and (3), and then the equations can be solved for the coordinate points hB and zB of the aspheric compensation surface 22. The solution is:

$$hB1 := \quad (5)$$
$$hF - \frac{1}{2}zsF\Big(2a0 + 2n^2g0zsF^2 + 2n^2zFzsF^2 - 2n^2\sqrt{1+zsF^2}\,g0 -$$
$$2n\sqrt{1+zsF^2}\,a0 - 2zsFhF - 2zsF^2g0 - 2zsF^2zF +$$
$$2n^2zF + 2n^2g0 + 2sqrt\big(2n^2g0^2zsF^2 + zF^2n^2zsF^2 +$$
$$zF^2n^2 - 2g0^2n^2\sqrt{1+zsF^2}\, + a0^2 +$$
$$2n^2\sqrt{1+zsF^2}\,g0zsFhF - 2zFn^2\sqrt{1+zsF^2}\,g0 -$$
$$2g0n\sqrt{1+zsF^2}\,a0 - 2zFn\sqrt{1+zsF^2}\,a0 -$$
$$2hFzsFzF - 2hFzsFg0 - 2zsF^2g0zF + 2n^2g0^2 +$$
$$2g0n^2zF + 2g0n^2zFzsF^2 - hF^2 - zsF^2g0^2 -$$
$$zsF^2zF^2 + 2ng0a0 + 2a0n^2g0zsF^2 + 2a0n^2zFzsF^2 -$$
$$2a0zsFhF - 2a0zsF^2g0 - 2a0zsF^2zF + 2a0n^2zF +$$
$$2a0n^2g0 + n^2zsF^2hF^2 - 2n\sqrt{1+zsF^2}\,a0^2 +$$
$$n^2hF^2 + 2n\sqrt{1+zsF^2}\,a0zsFhF + 2zsF^2ng0a0 -$$
$$2a0n^2\sqrt{1+zsF^2}\,g0 + n^2a0^2 + n^2a0^2zsF^2\big)\Big)\Big/$$
$$(n^2zsF^2 + n^2 - zsF^2 - 1) + zsFg0 + zsFzF$$

$$zB1 := \frac{1}{2}\Big(2a0 + 2n^2g0zsF^2 + 2n^2zFzsF^2 - 2n^2\sqrt{1+zsF^2}\,g0 - \quad (6)$$
$$2n\sqrt{1+zsF^2}\,a0 - 2zsFhF - 2zsF^2g0 - 2zsF^2zF +$$
$$2n^2zF + 2n^2g0 + 2sqrt\big(2n^2g0^2zsF^2 + zF^2n^2zsF^2 + zF^2n^2 -$$
$$2g0^2n^2\sqrt{1+zsF^2}\, + a0^2 + 2n^2\sqrt{1+zsF^2}\,g0zsFhF -$$
$$2zFn^2\sqrt{1+zsF^2}\,g0 - 2g0n\sqrt{1+zsF^2}\,a0 -$$
$$2zFn\sqrt{1+zsF^2}\,a0 - 2hFzsFzF - 2hFzsFg0 -$$
$$2zsF^2g0zF + 2n^2g0^2 + 2g0n^2zF + 2g0n^2zFzsF^2 -$$
$$hF^2 - zsF^2g0^2 - zsF^2zF^2 + 2ng0a0 + 2a0n^2g0zsF^2 +$$
$$2a0n^2zFzsF^2 - 2a0zsFhF - 2a0zsF^2g0 - 2a0zsF^2zF +$$
$$2a0n^2zF + 2a0n^2g0 + n^2zsF^2hF^2 - 2n\sqrt{1+zsF^2}\,a0^2 +$$

-continued
$$n^2hF^2 + 2n\sqrt{1+zsF^2}\,a0zsFhF + 2zsF^2 ng0a0 -$$
$$2a0n^2\sqrt{1+zsF^2}\,g0 + n^2a0^2 + n^2a0^2 zsF^2 \Big)\Big) \Big/$$
$$(n^2 zsF^2 + n^2 - zsF^2 - 1)$$

In the right side case of FIG. 3, equations (2) and (3) are still valid, whereas Eq. (4) must be modified to $$R - a + n \cdot g = R - a0 + n \cdot g0 \rightarrow g = \frac{n \cdot g0 + a - a0}{n} \text{ with} \tag{7}$$
$$a = \sqrt{(a0+zB)^2 + hB^2}$$

In FIG. 3, the +z axis points up. The +z-axis characterizes the direction of the light. a0 is the axial distance of the object point to the first surface. In the usual sign convention (for instance used in ZEMAX), a0 has a positive numerical value in the case of FIG. 3 left, and a negative value in the FIG. 3 right. Equations (4) and (7) reflect that convention. The solution for the case of FIG. 3 right is:

$$hB2 := \tag{8}$$
$$hF - \frac{1}{2}zsF\Big(2a0 + 2n^2 g0zsF^2 + 2n^2 zFzsF^2 - 2n^2\sqrt{1+zsF^2}\,g0 -$$
$$2n\sqrt{1+zsF^2}\,a0 - 2zsFhF - 2zsF^2 g0 - 2zsF^2 zF +$$
$$2n^2 zF + 2n^2 g0 + 2sqrt\Big(2n^2 g0^2 zsF^2 + zF^2 n^2 zsF^2 +$$
$$zF^2 n^2 - 2g0^2 n^2 \sqrt{1+zsF^2} + a0^2 +$$
$$2n^2\sqrt{1+zsF^2}\,g0zsFhF - 2zFn^2\sqrt{1+zsF^2}\,g0 -$$
$$2g0n\sqrt{1+zsF^2}\,a0 - 2zFn\sqrt{1+zsF^2}\,a0 -$$
$$2hFzsFzF - 2hFzsFg0 - 2zsF^2 g0zF + 2n^2 g0^2 +$$
$$2g0n^2 zF + 2g0n^2 zFzsF^2 - hF^2 - zsF^2 g0^2 -$$
$$zsF^2 zF^2 + 2ng0a0 + 2a0n^2 g0zsF^2 + 2a0n^2 zFzsF^2 -$$
$$2a0zsFhF - 2a0zsF^2 g0 - 2a0zsF^2 zF + 2a0n^2 zF +$$
$$2a0n^2 g0 + n^2 zsF^2 hF^2 - 2n\sqrt{1+zsF^2}\,a0^2 +$$
$$n^2 hF^2 + 2n\sqrt{1+zsF^2}\,a0zsFhF + 2zsF^2 ng0a0 -$$
$$2a0n^2\sqrt{1+zsF^2}\,g0 + n^2 a0^2 + n^2 a0^2 zsF^2\Big)\Big) \Big/$$
$$(n^2 zsF^2 + n^2 - zsF^2 - 1) + zsFg0 + zsFzF$$

$$zB2 := \frac{1}{2}\Big(2a0 + 2n^2 g0zsF^2 + 2n^2 zFzsF^2 - 2n^2\sqrt{1+zsF^2}\,g0 - \tag{9}$$
$$2n\sqrt{1+zsF^2}\,a0 - 2zsFhF - 2zsF^2 g0 - 2zsF^2 zF +$$
$$2n^2 zF + 2n^2 g0 + 2sqrt\Big(2n^2 g0^2 zsF^2 + zF^2 n^2 zsF^2 +$$
$$zF^2 n^2 - 2g0^2 n^2 \sqrt{1+zsF^2} + a0^2 +$$
$$2n^2\sqrt{1+zsF^2}\,g0zsFhF - 2zFn^2\sqrt{1+zsF^2}\,g0 -$$
$$2g0n\sqrt{1+zsF^2}\,a0 - 2zFn\sqrt{1+zsF^2}\,a0 -$$

-continued
$$2hFzsFzF - 2hFzsFg0 - 2zsF^2 g0zF + 2n^2 g0^2 +$$
$$2g0n^2 zF + 2g0n^2 zFzsF^2 - hF^2 - zsF^2 g0^2 -$$
$$zsF^2 zF^2 + 2ng0a0 + 2a0n^2 g0zsF^2 + 2a0n^2 zFzsF^2 -$$
$$2a0zsFhF - 2a0zsF^2 g0 - 2a0zsF^2 zF + 2a0n^2 zF +$$
$$2a0n^2 g0 + n^2 zsF^2 hF^2 - 2n\sqrt{1+zsF^2}\,a0^2 +$$
$$n^2 hF^2 + 2n\sqrt{1+zsF^2}\,a0zsFhF + 2zsF^2 ng0a0 -$$
$$2a0n^2\sqrt{1+zsF^2}\,g0 + n^2 a0^2 + n^2 a0^2 zsF^2\Big)\Big)\Big/$$
$$(n^2 zsF^2 + n^2 - zsF^2 - 1).$$

The procedure described, and the equations shown allow, for all aspheric Fizeau surfaces investigated so far, an aspheric compensation surface 22 to be used which has an aspheric departure less than the Fizeau reference surface 24. Absent this for determining the optimal radius of curvature for the compensation surface 22, one would have more than twice the aspheric departure.

The aspheric departure needed for the compensation surface 22 can be further lowered by introducing a second lens element in between the element just described and the de-collimator 18. The drawback in doing this is in adding to complexity and the cost of another element and the additional requirements on stability and alignment. But as will be described, both requirements can be met with the techniques of the invention.

The high amount of aspheric departure which is needed at the wavefront matching the aspheric Fizeau surface, and which is produced by the single aspherical compensation surface 22, is the reason for a high sensitivity of this surface for alignment errors with respect to the de-collimator. In other words, the requirements for thermal and mechanical stability between the two measurements needed, i.e., the calibration measurement on the master calibration artifact and the test part. The stability needed can be in the range of 30 nm, or even less, when the measurement uncertainty of 0.05 nm, in both the measurements for the master calibration surface and the test surface, must be reached. This value is typical for measurements on next generation lithography tools. It is very expensive or even impossible to establish environmental conditions which guarantee this level of passive stability. It is therefore another objective of the invention to solve the problem that in both measurements—on the master and the part–the same optical conditions for the wavefront illuminating the Fizeau surface are established.

Figure 4A:
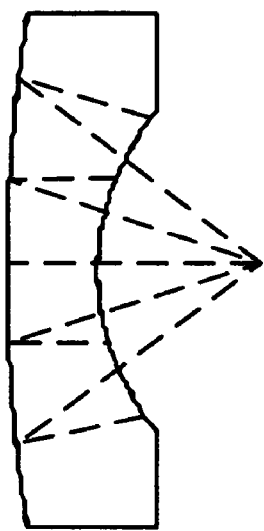
FIG. 4a diagrammatically shows-an optimal solution: input distance; a0=−180.891 mm results in an aspheric deviation of 0.637 mm only.
Figure 4B:
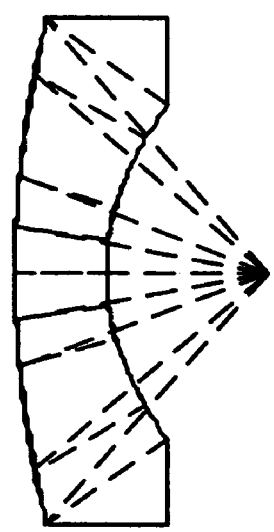
FIG. 4b diagrammatically shows a slightly larger input distance a0=−194.19 mm resulting in a much larger aspheric deviation of 2.2768 mm.

By way of example, FIG. 4 diagrammatically shows an optimal solution: input distance a0=−180.891 mm results in an aspheric deviation of 0.637 mm only; and FIG. 5 diagrammatically shows a slightly larger input distance a0=−194.19 mm results in a much larger aspheric deviation of 2.2768 mm.

The key advantages of the invention are:

1. The requirements for environmental stability (mainly temperature) is greatly reduced by this "active" concept in comparison to a pure passive concept
2. Very high measurement accuracy can be achieved
3. The alignment of the compensation element as well as of the test surface is automated; therefore the requirements on the skill of the operator is greatly reduced 4. A manufacturer of aspherical surfaces can use this same ability to produce its own aspherical calibration master surfaces, aspherical Fizeau reference surfaces and aspherical compensation surfaces. The invention shows, that by optimization of the input beam it is possible to keep the aspherical deformation needed for the compensation surface at a minimum, which is at least not larger than that of the aspherical test surface. This is a very cost effective way to perform a test on an aspheric surface.
5. The cavity between the aspherical Fizeau surface and the aspherical test surface (or master surface) can be kept so small (small means ≦1 mm), that high precision measurements in air are possible. By keeping this cavity small, the uncertainty of the final measurement becomes smaller for larger residual intrinsic aberrations in the mainframe interferometer.
6. The small cavity between the aspherical Fizeau surface and the aspherical test surface (or master surface) lowers the influence of changes in the wavelength or index of refraction of the air between calibration and measurement.
7. The possibility of the measurement of the absolute cavity thickness enables to measure in addition to the aspherical deviation also the basic radius of the asphere or in the case of measurements of spheres enables to measure the radius of the sphere together with the figure measurement.

Having described the fundamentals of the invention, other variants will occur to those skilled in the art based on its teachings. For example, such variants include:
(1) The double phase-shift can be performed by one physical movement with a PZT and wavelength-shifting;
(2) A conventional TS lens can be used which carries the spherical Fizeau reference surface; in this case the main cavity is still between the aspheric Fizeau reference surface and the second cavity is between the spherical Fizeau surface on the TS lens and the aspherical Fizeau reference surface. This second cavity now also includes the very alignment sensitive aspherical compensation surface and probably additional optical elements; and
(3) The large beamsplitter plate "BS" shown in FIG. 2 and the two collimator lenses shown in FIG. 2 can be replaced by one collimator lens and a smaller beam splitter behind the collimator, perhaps a polarization active beamsplifter cube and a quarter-wave plate placed at an appropriate place. In this case, the TF shown in FIG. 2 can be replaced by a smaller reference surface, for instance a spherical surface matching the spherical wavefront of the collimator (at the convergent side of the beam). In this case, larger amounts of the optics influencing the result are included in the monitoring and control of the change of the wavefront illuminating the Fizeau reference surface between calibration and measurement.

Other variants will occur to those skilled in the art, and it is intended that they be covered by the appended claims

What is claimed is:

1. Interferometric apparatus for measuring rotationally and non-rotationally symmetric test optics, said interferometric apparatus comprising:
    means for mounting a test optic to be measured so that it can be illuminated as it is precisely aligned;
    an illumination source for providing a beam of illumination having at least two wavelengths;
    a transmission flat following said illumination source;
    a basic optical system following said transmission flat for receiving said beam of illumination and generating at least one basic wavefront having a predetermined shape;
    a compensation component following said basic optical system by a predetermined distance, said compensation component comprising a first aspherical surface and an aspherical reference surface; said first aspherical surface having a radius of curvature and position such that its aspherical departure is no larger than that of said aspherical reference surface, said compensation component operating to modify said basic wavefront so that it impinges on said aspherical reference surface with substantially the same shape as that of said aspherical reference surface and such that a part of it is reflected therefrom to serve as a reference wavefront and a part is transmitted as a continuing wavefront that impinges on said test optic and is reflected therefrom as a measurement wavefront that travels back towards said aspherical reference surface when said aspherical reference surface is precisely aligned adjacent said test optic to be measured; and
    means for combining said reference and measurement wavefronts to form an interferogram containing phase information indicative of the shape of the wavefront generated by said test optic.

2. The interferometric apparatus of claim 1 further including means for performing multi-phase shifting interferometry utilizing both wavelengths of said beam of illumination to precisely set said predetermined distance separating said basic optical system from said compensation component.

3. The interferometric apparatus of claim 2 further including means for measuring the alignment of said compensation component with respect to said basic optical system and providing feedback control signals to precisely position said compensation component by correcting for misalignments thereof.

4. The interferometric apparatus of claim 3 wherein said alignment is carried out in six degrees of freedom.

5. The interferometric apparatus of claim 2 wherein the normal distance separating said aspheric reference surface and said test surface is substantially a constant.

6. The interferometric apparatus of claim 2 wherein said compensation component is selected from the group consisting of:
    an aplanatic surface of the back-side of a lens element which has a concentric Fizeau reference surface on its front side for testing spheres;
    an aspherical back side of a lens element, which carries an aspherical Fizeau reference surface on its front side;
    a hologram followed by a lens element, which carries a spherical surface at its front side and an aspherical Fizeau reference surface at its backside;
    a lens with one aspherical surface and one spherical surface;
    a lens with with two spherical surfaces in addition to the lens carrying an aspherical reference surface on its front side and a spherical or aspherical surface on its back side.

7. The interferometric apparatus of 2 wherein three simultaneous interferograms are formed for purposes of facilitating alignment including one interferogram formed between a reference surface placed in front of said basic optical system and said aspherical reference surface, another interferogram formed between the test surface and said aspherical reference surface, and a third interferogram which is formed between said reference surface placed in front of said basic optical system and the test surface.

8. The interferometric apparatus of claim 7 further including computational means for separately computing three phase-differences encoded in said three interferograms using different phase-steps and two phase-shifters that change the phase-difference in all three interferometric cavities in a way that produces a system of equations having a non-vanishing determinant.

9. The interferometric apparatus of claim 2 further including means for imaging said interferogram on to a photodetector for generating an electrical signal containing phase information corresponding to the difference between the anticipated shape of the wavefront generated by the test surface and its actual performance.

10. The interferometric apparatus of claim 2 further including means for precisely aligning said test optic with respect to said aspherical reference surface.

11. Interferometric apparatus for measuring rotationally and non-rotationally symmetric test optics, said interferometric apparatus comprising:
  means for mounting a test optic to be measured so that it can be illuminated as it is precisely aligned;
  an illumination source for providing a beam of illumination having at least two wavelengths;
  a transmission flat following said illumination source;
  a basic optical system following said transmission flat for receiving said beam of illumination and generating at least one basic wavefront having a predetermined shape;
  a compensation component following said basic optical system by a predetermined distance, said compensation component comprising a first aspherical surface and an aspherical reference surface; said first aspherical surface having a radius of curvature and position such that its aspherical departure is no larger than that of said aspherical reference surface, said compensation component operating to modify said basic wavefront so that it impinges on said aspherical reference surface with substantially the same shape as that of said aspherical reference surface and such that a part of it is reflected therefrom to serve as a reference wavefront and a part is transmitted as a continuing wavefront that impinges on said test optic and is reflected therefrom as a measurement wavefront that travels back towards said aspherical reference surface when said aspherical reference surface is precisely aligned adjacent said test optic to be measured;
  means for combining said reference and measurement wavefronts to form an interferogram containing phase information indicative of the shape of the wavefront generated by said test optic;
  means for performing multi-phase shifting interferometry utilizing both wavelengths of said beam of illumination to precisely set said predetermined distance separating said basic optical system from said compensation component;
  means for measuring the alignment of said compensation component with respect to said basic optical system and providing feedback control signals to precisely position said compensation component by correcting for misalignments thereof; and
  means for precisely aligning said test optic with respect to said aspherical reference surface.

12. An interferometric method for measuring rotationally and non-rotationally symmetric test optics, said interferometric method comprising the steps of:
  mounting a test optic to be measured so that it can be illuminated as it is precisely aligned;
  generating a beam of illumination having at least two wavelengths;
  providing a transmission flat with a reference surface following said illumination source;
  generating at least one basic wavefront having a predetermined shape;
  providing a compensation component, said compensation component comprising a first aspherical surface and an aspherical reference surface; said first aspherical surface having a radius of curvature and position such that its aspherical departure is no larger than that of said aspherical reference surface, said compensation component operating to modify said basic wavefront so that it impinges on said aspherical reference surface with substantially the same shape as that of said aspherical reference surface and such that a part of it is reflected therefrom to serve as a reference wavefront and a part is transmitted as a continuing wavefront that impinges on said test optic and is reflected therefrom as a measurement wavefront that travels back towards said aspherical reference surface when said aspherical reference surface is precisely aligned adjacent said test optic to be measured; and
  combining said reference and measurement wavefronts to form an interferogram containing phase information indicative of the shape of the wavefront generated by said test optic.

13. The interferometric method of claim 12 further including the step of performing multi-phase shifting interferometry utilizing both wavelengths of said beam of illumination to precisely align said compensation component with respect to said basic wavefront.

14. The interferometric method of claim 13 further including the step of measuring the alignment of said compensation component with respect to said basic wavefront and providing feedback control signals to precisely position said compensation component by correcting for misalignments thereof.

15. The interferometric method of claim 14 wherein said alignment is carried out in six degrees of freedom.

16. The interferometric method of claim 13 wherein the normal distance separating said aspheric reference surface and said test surface is substantially a constant.

17. The interferometric method of claim 13 wherein said compensation component is selected from the group consisting of:
  an aplanatic surface of the back-side of a lens element which has a concentric Fizeau reference surface on its front side for testing spheres;
  an aspherical back side of a lens element, which carries an aspherical Fizeau reference surface on its front side;
  a hologram followed by a lens element, which carries a spherical surface at its front side and an aspherical Fizeau reference surface at its backside;
  a lens with one aspherical surface and one spherical surface;
  a lens with with two spherical surfaces in addition to the lens carrying an aspherical reference surface on its front side and a spherical or aspherical surface on its back side.

18. The interferometric method of 13 wherein three simultaneous interferograms are formed for purposes of facilitating alignment including one interferogram formed between a reference surface placed in front of said basic optical system and said aspherical reference surface, another interferogram formed between the test surface and said aspherical reference surface, and a third interferogram which is formed between said reference surface placed in front of said basic optical system and the test surface.

19. The interferometric method of claim 18 further including the step of separately computing three phase-differences encoded in said three interferograms using different phase-steps and two phase-shifters that change the phase-difference in all three interferometric cavities in a way that produces a system of equations having a non-vanishing determinant.

20. The interferometric method of claim 13 further including the step of imaging said interferogram on to a photodetector for generating an electrical signal containing phase information corresponding to the difference between the anticipated shape of the wavefront generated by the test surface and its actual performance.

21. The interferometric method of claim 13 further the step of precisely aligning said test optic with respect to said aspherical reference surface.

22. Interferometric apparatus for measuring rotationally and non-rotationally symmetric test optics, said interferometric method comprising the steps of:
- mounting a test optic to be measured so that it can be illuminated as it is precisely aligned;
- providing a beam of illumination having at least two wavelengths;
- providing a transmission flat having a reference surface following said beam of illumination;
- receiving said beam of illumination and generating at least one basic wavefront having a predetermined shape;
- providing a compensation component following said basic optical system by a predetermined distance, said compensation component comprising a first aspherical surface and an aspherical reference surface; said first aspherical surface having having a radius of curvature and position such that its aspherical departure is no larger than that of said aspherical reference surface, said compensation component operating to modify said basic wavefront so that it impinges on said aspherical reference surface with substantially the same shape as that of said aspherical reference surface and such that a part of it is reflected therefrom to serve as a reference wavefront and a part is transmitted as a continuing wavefront that impinges on said test optic and is reflected therefrom as a measurement wavefront that travels back towards said aspherical reference surface when said aspherical reference surface is precisely aligned adjacent said test optic to be measured;
- combining said reference and measurement wavefronts to form an interferogram containing phase information indicative of the shape of the wavefront generated by said test optic;
- performing multi-phase shifting interferometry utilizing both wavelengths of said beam of illumination to precisely set with respect to said compensation component;
- measuring the alignment of said compensation component with respect to said basic wavefront and providing feedback control signals to precisely position said compensation component by correcting for misalignments thereof; and
- precisely aligning said test optic with respect to said aspherical reference surface.

23. Interferometric apparatus for measuring rotationally and non-rotationally symmetric test optics, said interferometric apparatus comprising:
- means for mounting a test optic to be measured so that it can be illuminated as it is precisely aligned;
- an illumination source for providing a beam of illumination having at least two wavelengths;
- a transmission flat following said illumination source;
- a basic optical system following said transmission flat for receiving said beam of illumination and generating at least one basic wavefront having a predetermined shape;
- a compensation component following said basic optical system by a predetermined distance, said compensation component comprising a first aspherical surface and an aspherical reference surface; said compensation component operating to modify said basic wavefront so that it impinges on said aspherical reference surface with substantially the same shape as that of said aspherical reference surface and such that a part of it is reflected therefrom to serve as a reference wavefront and a part is transmitted as a continuing wavefront that impinges on said test optic and is reflected therefrom as a measurement wavefront that travels back towards said aspherical reference surface when said aspherical reference surface is precisely aligned adjacent said test optic to be measured;
- means for combining said reference and measurement wavefronts to form an interferogram containing phase information indicative of the shape of the wavefront generated by said test optic; and
- means for performing multi-phase shifting interferometry utilizing both wavelengths of said beam of illumination to precisely set said predetermined distance separating said basic optical system from said compensation component.

24. The interferometric apparatus of claim 23 further including means for measuring the alignment of said compensation component with respect to said basic optical system and providing feedback control signals to precisely position said compensation component by correcting for misalignments thereof.

25. The interferometric apparatus of claim 24 further including means for precisely aligning said test optic with respect to said aspherical reference surface.

* * * * *